United States Patent [19]

Giessler

[11] Patent Number: 4,930,949
[45] Date of Patent: Jun. 5, 1990

[54] THREAD MILLING CUTTER

[75] Inventor: Josef Giessler, Zell-Harmersbach, Fed. Rep. of Germany

[73] Assignee: Prototyp-Werke GmbH Fabrik für Präzisionswerkzeuge, Zell-Harmersbach, Fed. Rep. of Germany

[21] Appl. No.: 316,818

[22] Filed: Feb. 28, 1989

[30] Foreign Application Priority Data

Mar. 16, 1988 [DE] Fed. Rep. of Germany ....... 3808797

[51] Int. Cl.⁵ .............................................. B23G 5/20
[52] U.S. Cl. ..................................... 408/222; 10/140; 10/141 R; 409/74
[58] Field of Search ................. 10/140, 141 R, 152 T; 408/218–222; 409/65, 66, 74, 77, 71; 411/386, 387

[56] References Cited

U.S. PATENT DOCUMENTS

| 124,570 | 3/1872 | Gunn | 408/218 |
|---|---|---|---|
| 2,557,733 | 6/1951 | Forcier et al. | 408/222 |
| 2,684,492 | 7/1954 | Miner et al. | 408/219 |
| 4,271,554 | 6/1981 | Grenell | 408/220 X |
| 4,651,374 | 3/1987 | Turchan | 10/140 |
| 4,761,844 | 8/1988 | Turchan | 408/222 X |

FOREIGN PATENT DOCUMENTS

| 55-24862 | 2/1980 | Japan | 408/222 |
|---|---|---|---|
| 62-4515 | 1/1987 | Japan | 10/140 |

Primary Examiner—E. Michael Combs
Attorney, Agent, or Firm—Kerkam, Stowell, Kondracki & Clarke

[57] ABSTRACT

In a thread milling cutter comprising at its tip cutting edges for making a bore, said cutting edges are formed as face milling cutting edges which enclose a mutual angle of 180° or more, so that the thread milling cutter on reaching the intended drill hole depth and in order to be laterally moved need not first be raised. Also, it is possible with the thread milling cutter according to the invention when using said cutter to make threads of any desired diameter with the same thread pitch because the tool tip does not run against the drill hole bottom when laterally moved or offset as with the known thread milling cutter.

In addition it is possible with the same tool to provide the thread at the entry with an edge-chamfer in such a manner that impairment thereof by formation of burrs is impossible.

9 Claims, 1 Drawing Sheet

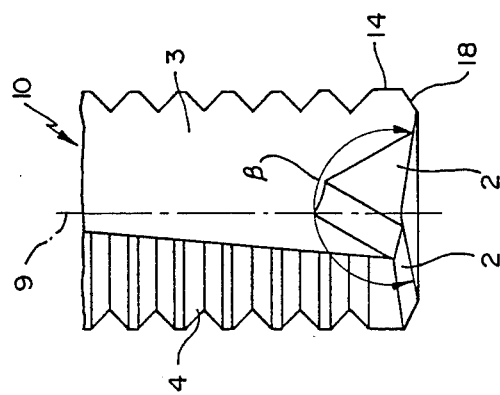
FIG. 2b
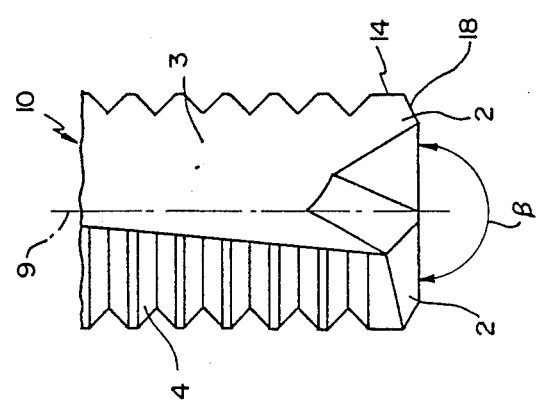
FIG. 2a
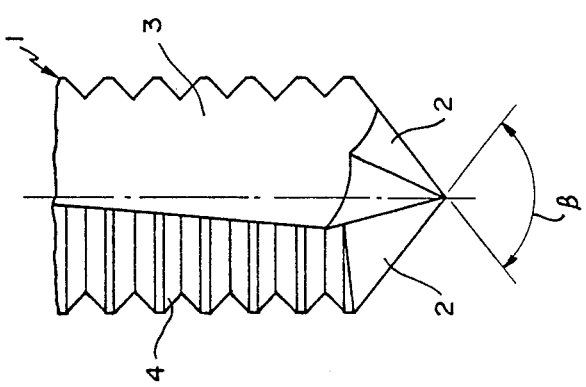
FIG. 1—PRIOR ART

THREAD MILLING CUTTER

BACKGROUND OF THE INVENTION

1. Field of the Invention

The invention relates to a thread milling cutter having an elongated shank, the tip of which comprises at least two cutting edges for forming a bore, which enclose together an end face angle and which are each separated by a chip groove, the cutter comprising at its outer side between the chip grooves respectively at least one toothed thread milling cutting edge provided with cutting studs.

2. Description of the Prior Art

Such a thread milling cutter is known from U.S. Pat. No. 4,651,374 and is formed like a drill having a drill tip formed by two cutting edges and four chip flutes or grooves extending spirally at the outer surface of the tool, two of which originate from the peripheral edges of the cutting edges and the other two of which terminate axially offset at the rear. In contrast to a drill, however, the spiral peripheral regions of the tool separated by the chip grooves are provided with tooth-like cutting lands or studs having clearance angles (undercut) produced by grinding and extending substantially in the peripheral direction of the tool.

The two drill cutting edges at the tip of the tool are inclined to each other at an angle measured from the side of the tool, which may, for example, be 120°; the two cutting edges are generatrices of a cone face.

The end of the known thread milling cutter remote from the drill tip preferably comprises an increased diameter and is designed for clamping in a machine tool.

The purpose of the known thread milling cutter is to produce in the simplest and most economical manner a thread blind hole. For this purpose the thread milling cutter is first set in rotation, like a drill, about its longitudinal axis and sunk into the material to be provided with the thread blind hole until the desired drill hole depth is reached.

The tool is then slightly raised so that its tip is no longer centered by the conically deepened drill hole bottom and is set in such a rotation that the peripheral speed corresponds to the necessary cutting speed at the cutting lands or studs. The tool is now laterally offset with respect to the drill hole axis by the depth of the thread flight to be formed, always maintaining parallel alignment with said axis, whereupon the tool follows with its centre axis a circular curve having a radius corresponding to said lateral offsetting. In this manner the tool covers a path of at least 360°. At the same time the tool is raised uniformly by the magnitude of the thread pitch. A finished blind hole thread is now milled over the entire drill hole length. The milling cutter now need only be centered again with respect to the drill hole and can then be withdrawn from the drill hole.

In this manner it has already proved possible by means of a special thread milling machine to drill in aluminum with a single spindle and thus a single thread milling cutter more than 120 blind holes per minute and provide them with an internal thread. The thread entry of said blind holes, however, inevitably has a burr which, on turning in threaded bolts, can get between the external and internal thread, impairing turning in of the threaded bolt and leading to damage of the thread. Burr removing is, however, not satisfactorily possible by machine and is usually done by hand and this partially eliminates the advantage of rapid drilling and thread cutting achieved with the known milling cutter.

The thread blind holes made in this manner also have at the drill hole bottom the usual drill termination extending beyond the lowest thread flight, so that the blind hole itself is deeper than the screw-in depth which can be achieved. It would, however, be advantageous in many cases if the thread flights or turns extended up to the drill hole bottom. However, making such a thread blind hole is exceedingly complicated; it must be carried out with specially ground taps and is therefore avoided whenever possible so that such a threaded blind hole is considered to be a design error in studies made during engineering training unless specific circumstances make such a blind hole design absolutely essential.

A series production of such blind holes is inconveivable, even more so with the afore-mentioned production rate.

A further disadvantage of the known thread milling cutters resides in that a separate tool is required for practially each thread nominal diameter. This requires, however, precisely in the case of precision thread drillings with relatively large diameter the availability of a large number of expensive thread milling cutters.

SUMMARY OF THE INVENTION

The invention is thus based on the problem of further developing a thread milling cutter so that it can be used for milling preferably burr-free blind holes with the maximum possible screw-in depth and with a diameter which does not only correspond to the nominal diameter (external diameter of the thread milling cutter plus twice the lead) but can also be larger as desired so that it is possible with one and the same thread milling cutter to make threaded blind holes which have the same pitch but very different diameters and preferably a burr-free thread entry. A method is desired, with which at least one of these aims is achievable.

The invention therefore proposes in a thread milling cutter comprising an elongated shank the tip of which comprises at least two cutting edges for forming a bore, which enclose together an end face angle and which are each separated by a chip groove, the cutter comprising at its outer side between the chip grooves respectively at least one toothed thread milling cutting edge provided with cutting studs, the improvement that the cutting edges for forming a bore are formed as face milling cutting edges and the end face angle ($\beta$) is at least 180°.

The tool according to the invention is not constructed as drill like the known tool but rather as face milling cutter, the face cutting edges enclosing together an angle which is at least 180°. After reaching the desired drill hole depth, the tool according to the invention can thus be immediately moved laterally by any desired extent, whereafter the tool moves along its curve path and in doing so is raised by the magnitude of the pitch. It is also possible to move the tool laterally by a relatively small amount, borderline cases only by the amount of the lead.

In milling, the thread diameter which can be obtained in a single revolution is limited only by the fact that the lateral offsetting of the thread milling cutter axis and drill hole axis must not be more than at the most the external diameter of the thread milling cutter since otherwise a drill hole is not milled but a circular groove. It is, however, fundamentally possible by several tool revolutions to mill a threaded blind hole with practically unlimited diameter. This is particularly important for the optical and precision engineering industry in which precise fine internal threads must be made with relatively large diameter.

The end face angle of the face milling cutting edges may be 180° but according to a preferred development of the invention is more than 180°, so that the tool according to the invention has a flat hollow tip which contributes to the self-centering of the tool. The drill hole bottom thus has a flat conical protrusion which, however, upon lateral moving of the rotating tool is immediately removed by the face milling cutting edges and thus does not obstruct this lateral offsetting or movement.

It is fundamentally possible with the tool according to the invention to mill a thread, the flights or turns of which extend up to the flat drill hole bottom. Since, however, even after blasting out with compressed air, dirt can collect at the drill hole bottom in accordance with a preferred development of the invention, it is advantageous to provide at the end of the thread milling cutting edges facing the tool tip instead of a tooth-like cutting stud or land an elongated peripheral cutting edge having a length which is preferably once or twice the thread pitch. By these peripheral cutting edges a peripheral groove forming a relief groove undercut results at the drill hole bottom, into which the thread flight produced terminates. It is therefore possible to screw in a screw until the bore bottom is reached.

According to a further preferred and particularly important development of the invention, the lower peripheral edge of the milling cutter has a cutting chamfer which is preferably formed as with radial clearance angles (undercuts) produced by grinding at the transition between a face milling cutting edge and a peripheral cutting edge.

It is possible by means of this configuration to first mill a counter-sink depression having a diameter which is adapted to the internal thread to be made in the workpiece surface in which a threaded blind hole is to be formed in such a manner that the internal thread runs into the counter sink. The milling cutter is eccentrically set and covers a circular path. Thereafter in the manner described above the blind hole is drilled and the thread milled. It has been found that this prevents occurrence of a burr at the thread entry.

It is fundamentally also possible with the milling cutter further developed according to the invention to countersink the thread hole made afterwards at the entry but when this method is adapted a small burr will always be unavoidable.

The invention relates expressly not only to the thread milling cutter described but expressly also to the method described for milling a threaded bore having a diameter which is greater than the nominal diameter of the thread milling cutter, and the method according to the invention can be used not only for blind bores but also for threaded through bores which can also be made with the known thread milling cutter described at the beginning when using the method according to the invention. The thread milling cutter, the cutting edge of which preferably has a length which is greater than the thickness of a wall to be provided with a through bore, is employed to make a through bore. Thereafter the thread milling cutter is laterally moved or offset by an amount which need not be greater than the lead of the thread to be made. Thereafter the tool spindle (the centre point of the circular path) is aligned with the centre axis of the threaded bore to be formed. Finally, a circular path is milled into the wall to be provided with the threaded bore with the thread milling cutter like an end milling cutter and after completion thereof the threaded bore is finished and a core piece of greater or lesser magnitude remains which itself did not have to be cut at all to make the threaded bore.

The invention also relates to the method of counter sinking the threaded bore, whether it is a blind bore or a through bore, in one working operation with the production of the bore and by means of the thread milling cutter, preferably prior to forming the bore but possibly also after formation of the threaded bore.

The chips detached by the face milling cutting edges are removed from the drill hole through chip grooves or flutes as in a drill. According to a preferred development of the invention, however, the face milling cutting edges participating in the drilling operation are provided at least partially with chip breaker grooves or flutes to prevent a chip jamming in the cutting region of the tool and causing untrue running of the bore.

Preferably, the chip breaker grooves can be dispensed with completely or partially only in the dimensioning range of less than 20 mm.

Although in the drawings of U.S. Pat. No. 4,651,374 already cited about, in the sectional view of FIG. 3 an outer contour of the tool is shown at the drill tip which is not toothed, this is certainly not a peripheral cutting edge for producing a relief groove but a mistake in the drawings as can be seen by comparison with FIG. 1.

The thread milling cutter shown in the drawing of the publication moreover has more chip grooves and thus thread milling cutting edges than end-face drill cutting edges. For this reason the thread milling cutting edges not terminating in a drill cutting edge must be set back with respect to the tool tip and only the milling cutting edges which merge into drill cutting edges can cut the lower thread end. As a result the thread end is not clean.

In contrast, in accordance with a further preferred embodiment, the thread milling cutter according to the invention can have more than two end face cutting edges and preferably has three or four thereof, so that the thread milling cutting edges each extend up to a face milling cutting edge and consequently the thread end or thread relief groove is cut just as cleanly as all the remaining portions of the internal thread formed.

As described above, covering a circular path curve of 360° suffices for complete formation of a thread. However, preferably this angle will be slightly exceeded in order to achieve a particularly clean thread form.

The axial length of the thread milling cutting edges is preferably at least equal to the thread depth of the drill hole to be made.

The tool according to the invention can also be used for the production of a multiply threaded thread.

As already mentioned above, the tool according to the invention can be used not only to make a blind hole but like the known tool also to make a thread through bore.

BRIEF DESCRIPTION OF THE DRAWINGS

The invention will be explained hereinafter in detail by way of example with the aid of the schematic drawings, wherein:

FIG. 1 shows the tip of the known thread milling cutter,

FIG. 2a shows the tip of a first embodiment of a thread milling cutter according to the invention, FIG. 2b shows the tip of a second embodiment of a thread milling cutter according to the invention, FIG. 3 shows the cross-section of a thread blind hole formed with the thread milling cutter according to the invention and FIG. 4 is a side view of a thread milling cutter according to the invention.

DESCRIPTION OF THE PREFERRED EMBODIMENTS

In FIG. 1 a known thread milling cutter 1 is illustrated having a drill tip which is formed by two drill cutting edges 2 which enclose together an angle β which is substantially smaller than 180° and can be about 120°.

Wide chip grooves 3 separate the cutting edges 2 from each other in the peripheral direction and lead upwardly on the shank of the milling cutter, not shown in the drawing, to remove the chips which occur during the cutting operation during the drilling.

The peripheral region of the shank which lies between the chip grooves 3 comprises undercut cutting studs or lands 4 having clearance angles (undercuts) produced by grinding which extend in the peripheral direction. The length of the cutting studs 4 in the peripheral direction is relatively small.

The clearance angles (undercuts) of the cutting studs 4 effects that the studs do not jam on rotation of the tool even when per revolution of the tool, the tool is raised by the amount of one pitch.

In FIG. 2a a thread milling cutter 10 according to the invention is shown which also comprises chip grooves 3 which separate substantially peripherally extending cutting edge studs 4 from each other. The cutting edges 2 are, however, formed as face milling cutting edges and enclose together an angle β which is 180°.

In the embodiment shown in FIG. 2b the thread milling cutter 10 illustrated has a flat hollow tip, the angle β formed between the end face milling cutting edges 2 being slightly greater than 180°.

Furthermore, the face milling cutter shown in FIGS. 2a and 2b comprises instead of one to two lowermost cutting studs a peripheral cutting edge 14 which ensures a relief groove 6 (FIG. 3).

The chamfer 18 with a radial clearance angle (undercut) produced by grinding serves to produce an edge chamfer prior to the drilling and thread milling operation. This ensures a high-quality burr-free thread.

In FIG. 3 a threaded blind hole is shown as is made by a thread milling cutter as illustrated in FIG. 2a or 2b and is formed in a material 5 and is to have a centre axis 8 and an internal thread 7 which in turn comprises at the flat drill hole end a relief groove 6 and at the opposite thread entry an edge-chamfer 20.

The threaded blind hole shown in FIG. 3 is made by a tool of FIG. 2a or 2b in the following manner:

Firstly, the tool-longitudinal axis 9 is aligned with the axis 8 of the intended bore; along an axis 9 the thread milling cutter is advanced against the material 5, the face milling surfaces 2 removing the material and the chips being carried away outwardly through the chip grooves 3.

Firstly, the depth of the drilling is at the most that corresponding to the axial length of the edge-chamfer 20.

The tool is now moved radially with its axis 9 until the desired diameter of the edge-chamfer 20 is formed. A circular movement of 360° suffices for forming the edge-chamfer 20. Thereafter the tool is returned to the drill hole axis 8.

The actual drilling operation now begins.

The thread milling cutter is again advanced along its axis 9 against the material 5, the face cutting edges 2 removing the material and the chips being conveyed outwardly through the chip grooves.

On reaching the bore depth intended, the drill hole bottom is made planar when using the tool of FIG. 2a or with a slight conical protrusion when using the tool of FIG. 2b.

The rotation of the tool is now retained or changed so that the optimum cutting velocity of the cutting lands or studs 4 is achieved.

The tool is then moved with its axis 9 perpendicularly to the drill hole axis 8 with respect to the latter by an amount such that twice said amount plus the tool-external diameter correspond substantially to the thread nominal diameter. The cutting studs 4 and the peripheral cutting edges 14 then work into the material 5.

Once the desired spacing between the drill hole axis 8 and the tool axis 9 is reached, the tool axis 9 is moved on a circular curved path over at least 360°; simultaneously the tool 10 is raised by the extent of the pitch. When this is done, the internal thread 7 is milled with the desired diameter.

The tool must cover a circular path of at least 360°; this circular path should, however, not be much greater because otherwise the relief groove 6 achieved by the peripheral faces 14 is too long.

The thread milling cutter may be formed as double, triple or multiple cutter (with four or more cutting edges), and in the case of multiple cutters expediently not all the end face cutting edges participate in the drilling operation; as a rule only two or three cutting edges should be in engagement. The remaining cutting edges are slightly set back axially, the setting back having to be within the peripheral cutting edges 14 to exclude any impairment of the quality of the thread formed.

FIG. 4 shows a thread milling cutter having four cutting edges 2 and four chip grooves 3. In the tool shown all four face cutting edges 2 have the same width.

It is, however, also possible to form only two of the face cutting edges 2, so that they cut in the drilling operation, setting the other two face cutting edges slightly back axially. It is expedient in this case to make the chip grooves 3 associated with the respective face cutting edges 2 which cut in the drilling operation wider than the other chip grooves 3 which only have to carry away the chips collecting in the thread milling operation.

Furthermore, two of the face cutting edges 2 are provided with recesses 19 forming chip breakers, these being the two cutting edges participating in the drilling operation.

The face cutting edges 2 are provided at their peripheral-side end with a chamfer 18 with a radial clearance angle (undercut) produced by grinding which permits the formation of an edge-chamfer 20 at the start of the operation. In addition, the chamfer 18 increases the life of the tool.

Also the tool illustrated, like the tools shown in FIGS. 2a und 2b, comprises peripheral cutting edges 14 for forming the relief groove 6 and cutting studs 4 for milling the internal thread 7 which are separated respectively by thread grooves 13.

The tool shank 11 is designed for clamping the tool 10 in a machine tool and may have a thread, a clamping face or clamping-inclined surface or any other configurations usual in the field of machine tools for clamping.

The engagement portion 12 comprises the same or a smaller external diameter than the shank 11.

The thread milling cutter may be made from high-speed steel, sintered carbide or another suitable cutting material.

I claim:

1. A thread milling cutter comprising an elongated shank, the tip of which comprises at least two cutting edges for forming a bore, which enclose together an end face angle and which are each separated by a chip groove, the cutter comprising at its outer side between the chip grooves respectively at least one toothed thread milling cutting edge provided with cutting studs, wherein said two cutting edges for forming a bore are formed as a pair of face milling cutting edges and wherein said end face angle ($\beta$) for forming a hollow tip is greater than 180°, the face milling cutting edges inclined inwardly back from the tip.

2. A thread milling cutter according to claim 1, wherein the thread milling cutting edge or edges at the tip has or have an end stud with an elongated peripheral cutting edge.

3. A thread milling cutter according to claim 2, wherein at the transition between face milling cutting edge and peripheral cutting edge an edge-chamfer having clearance angles (undercut) produced by grinding is disposed.

4. A thread milling cutter according to claim 1, wherein more than two and preferably four face milling cutting edges are provided.

5. A thread milling cutter according to claim 1, wherein preferably with the thread milling cutter diameter of more than 20 mm at least one of the face milling cutting edges participating in the boring operation have chip breaker grooves.

6. A method of producing a threaded hole including the steps of:

rotating about a rotation axis a thread milling cutter comprising an elongated shank, the tip of which comprises at least two cutting edges for forming a bore, which enclose together an end face angle and which are each separated by a chip groove, the cutter comprising at its outer side between the chip grooves respectively at least one toothed thread milling cutting edge provided with cutting studs, wherein said two cutting edges for forming a bore are formed as a pair of face milling cutting edges and wherein said end face angle ($\beta$) for forming a hollow tip is greater than 180°, the face milling cutting edges inclined inwardly back from the tip; advancing the thread milling cutter against and into a material in which the threaded hole is to be made to make a hole of a given depth; and moving the thread milling cutter such that the rotation axis if offset from a central axis of the hole to form internal threads in the hole.

7. The method of claim 6 wherein the threaded hole is a threaded blind hole.

8. The method of claim 7 wherein the moving step is initially made with the thread milling cutter extending to the given depth of the hole and without any withdrawal of the thread milling cutter such that threads extend to the bottom of the hole.

9. The method of claim 6 wherein the threaded hole is a burr-free hole.

* * * * *